(12) United States Patent
Gerdes

(10) Patent No.: US 7,299,704 B1
(45) Date of Patent: Nov. 27, 2007

(54) METER CONNECTION SPREADING TOOL

(76) Inventor: Donald A. Gerdes, 213 S. Poplar St., Onarga, IL (US) 60955

( * ) Notice: Subject to any disclaimer, the term of this patent is extended or adjusted under 35 U.S.C. 154(b) by 0 days.

(21) Appl. No.: 11/507,594

(22) Filed: Aug. 22, 2006

Related U.S. Application Data

(60) Provisional application No. 60/797,689, filed on May 5, 2006.

(51) Int. Cl.
G01N 3/02 (2006.01)
(52) U.S. Cl. ...................................... 73/856
(58) Field of Classification Search .................. 73/856
See application file for complete search history.

(56) References Cited

U.S. PATENT DOCUMENTS

| 1,855,430 | A |   | 4/1932  | Tumblin   |        |
|-----------|---|---|---------|-----------|--------|
| 1,997,845 | A |   | 4/1935  | Adams     |        |
| 2,589,572 | A |   | 3/1952  | Rainwater |        |
| 2,706,613 | A |   | 4/1955  | Harris    |        |
| 2,795,437 | A |   | 6/1957  | Mueller   |        |
| 2,958,125 | A |   | 11/1960 | Nichols   |        |
| 3,414,961 | A |   | 12/1968 | Bjalme    |        |
| 3,571,896 | A |   | 3/1971  | Wilkerson |        |
| 3,722,065 | A | * | 3/1973  | Harris    | 29/237 |
| 4,178,668 | A |   | 12/1979 | George    |        |
| 4,236,290 | A |   | 12/1980 | McPherson |        |
| 4,598,452 | A |   | 7/1986  | Iseki     |        |
| D288,673  | S |   | 3/1987  | Nolte     |        |
| 4,748,730 | A |   | 6/1988  | George    |        |
| 4,844,431 | A | * | 7/1989  | Camp et al. | 269/25 |
| 5,052,721 | A |   | 10/1991 | Gorman, Jr. |      |
| 6,029,331 | A |   | 2/2000  | Simmons   |        |
| D472,835  | S |   | 4/2003  | Nendey    |        |
| 6,701,595 | B2|   | 3/2004  | Janovici  |        |

FOREIGN PATENT DOCUMENTS

JP          3-229096        10/1991

OTHER PUBLICATIONS http://www.pollardwater.com/emarket/pages/P740spreader.asp "Meter Base Spreader" retrieved on Mar. 7, 2006.

* cited by examiner

Primary Examiner—Edward Lefkowitz
Assistant Examiner—Octavia Davis
(74) Attorney, Agent, or Firm—Richard C. Litman

(57) ABSTRACT

The meter connection spreading tool is used to separate a water meter from a conduit entering or exiting the meter. The tool has an elongated handle terminating in a bifurcated fork. The tines of the fork are elongated and adapted for bearing against the body of the meter. A pair of parallel lugs extend normal to the tines adjacent their free end. A rigid U-shaped jaw has a pair of arms rigidly attached thereto and extending normal to the legs of the jaw adjacent the bight, the jaw being adapted to bear against a coupler attached to the end of the conduit. The free ends of the arms are pivotally attached to the lugs, so that the forked handle defines a lever and the lugs and free ends of the arms provide a fulcrum on which the lever pivots.

7 Claims, 3 Drawing Sheets

METER CONNECTION SPREADING TOOL

CROSS-REFERENCE TO RELATED APPLICATION

This application claims the benefit of U.S. Provisional Patent Application Ser. No. 60/797,689, filed May 5, 2006.

BACKGROUND OF THE INVENTION

1. Field of the Invention

The present invention relates to pry bar and spreader devices, and particularly to a meter connection spreading tool capable of being applied to a conduit, pipe, or similar meter inline connection in order to replace sealing gaskets, align pipe or conduit fittings, replace water meters, and the like.

2. Description of the Related Art

There are many instances where it is necessary to spread inline connections, i.e., couplings, in order to perform maintenance the coupling. For example, water meter and related inline couplings are generally located in a pit or other tight spot that makes it difficult to service.

A similar problem exists for the installation of a new meter in a cramped environment where the couplings are already in place. In both situations, it would be desirable for maintenance personnel to be able to spread a meter setting, i.e., separate a meter nipple from a conduit coupling, with one hand while having the other hand free to make adjustments in the coupling, such as installing a new gasket, washer, and the like.

Until now, it has been typical for the aforementioned procedures to be carried out by more than one person. One pair of hands might be needed to spread the connection while another pair of hands makes the required adjustments. Water departments have found the use of two persons to effect adjustment in an inline connection to be a time consuming, inefficient burden that raises maintenance costs.

The inline water meter connection is usually a very firm one, often requiring a significant amount of force to spread, which may result in injuries to service personnel. A labor saving spreading tool should also be compact in design because many meter connections are located at positions, which are difficult to access, thus making maneuverability by the technician(s) difficult.

Japanese Patent No. 3-229,096, published Oct. 11, 1991, appears to disclose a threaded member for installing a stop cock or the like, but does not appear to disclose or suggest the specific features of the present invention.

Thus, a meter connection spreading tool solving the aforementioned problems is desired.

SUMMARY OF THE INVENTION

The meter connection spreading tool is used to separate a water meter from a conduit entering or exiting the meter. The tool has an elongated handle terminating in a bifurcated fork. The tines of the fork are elongated and adapted for bearing against the body of the meter. A pair of parallel lugs extend normal to the tines adjacent their free end. A rigid U-shaped jaw has a pair of arms rigidly attached thereto and extending normal to the legs of the jaw adjacent the bight, the jaw being adapted to bear against a coupler attached to the end of the conduit. The free ends of the arms are pivotally attached to the lugs, so that the forked handle defines a lever and the lugs and free ends of the arms provide a fulcrum on which the lever pivots.

In use, the tool is inserted between the meter and the conduit with the jaw bearing against the coupler and the fork disposed over the meter inlet or outlet pipe, the tines bearing against the meter body. The handle is rotated, the fork pivoting about the ends of the arms, which serve as a fulcrum for the lever, until the tines move the meter a sufficient distance to separate the nipple at the end of the meter inlet or outlet from the coupler. The tool can be operated with a single hand, so that the other hand may be used to insert a washer or gasket between the meter nipple and the coupler at the end of the conduit. After placement of the gasket, reverse rotation of the handle causes the nipple to approximate or to re-enter the coupler at the end of the conduit, which may then be reattached to the inlet or outlet pipe. The meter connection spreading tool may be provided in various sizes for use with ⅝", ¾", 1", or other water meter sizes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
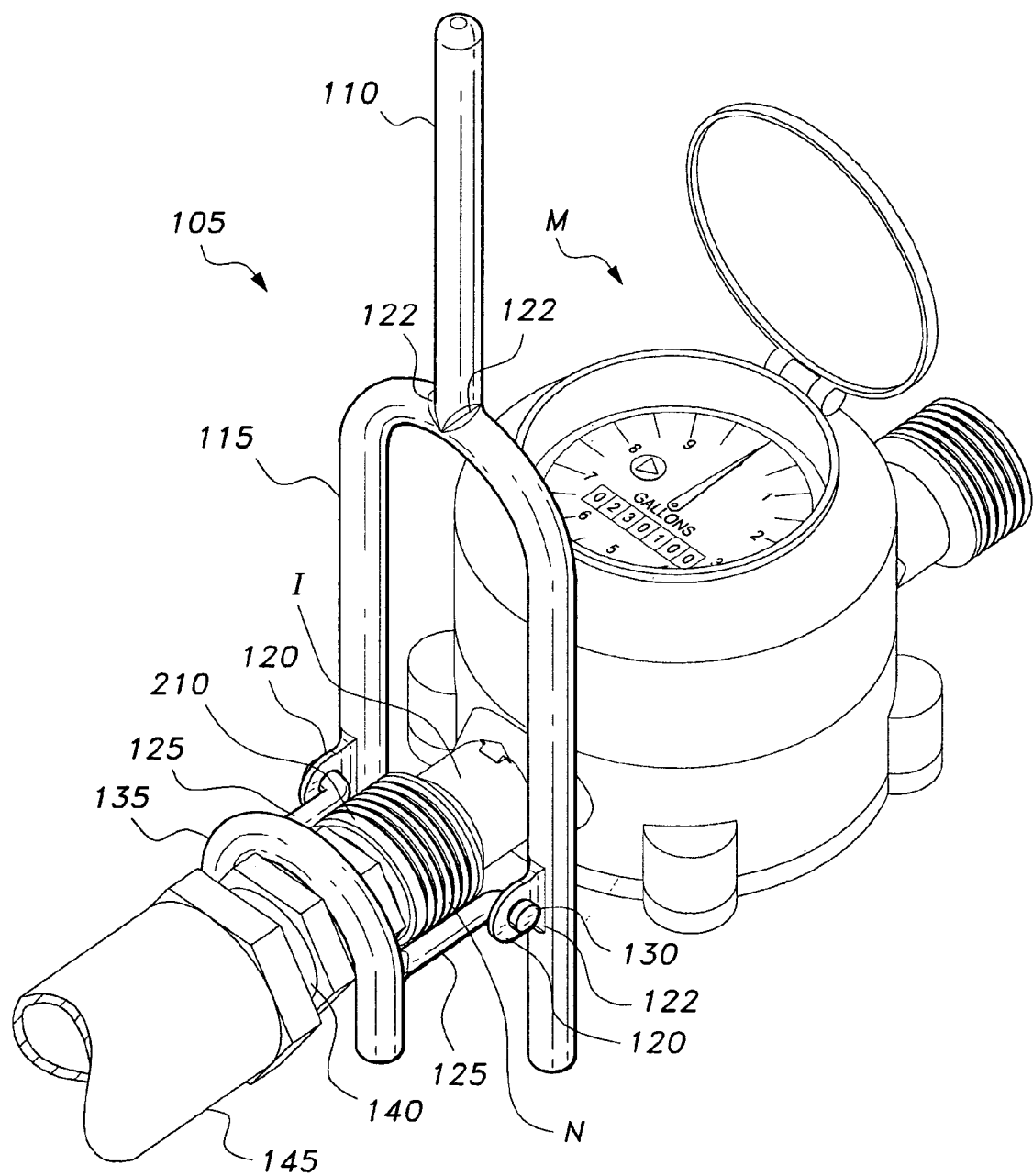
FIG. 1 is an environmental, perspective view of a meter connection spreading tool according to the present invention, showing insertion of the tool between the meter and conduit coupler before spreading.
Figure 2:
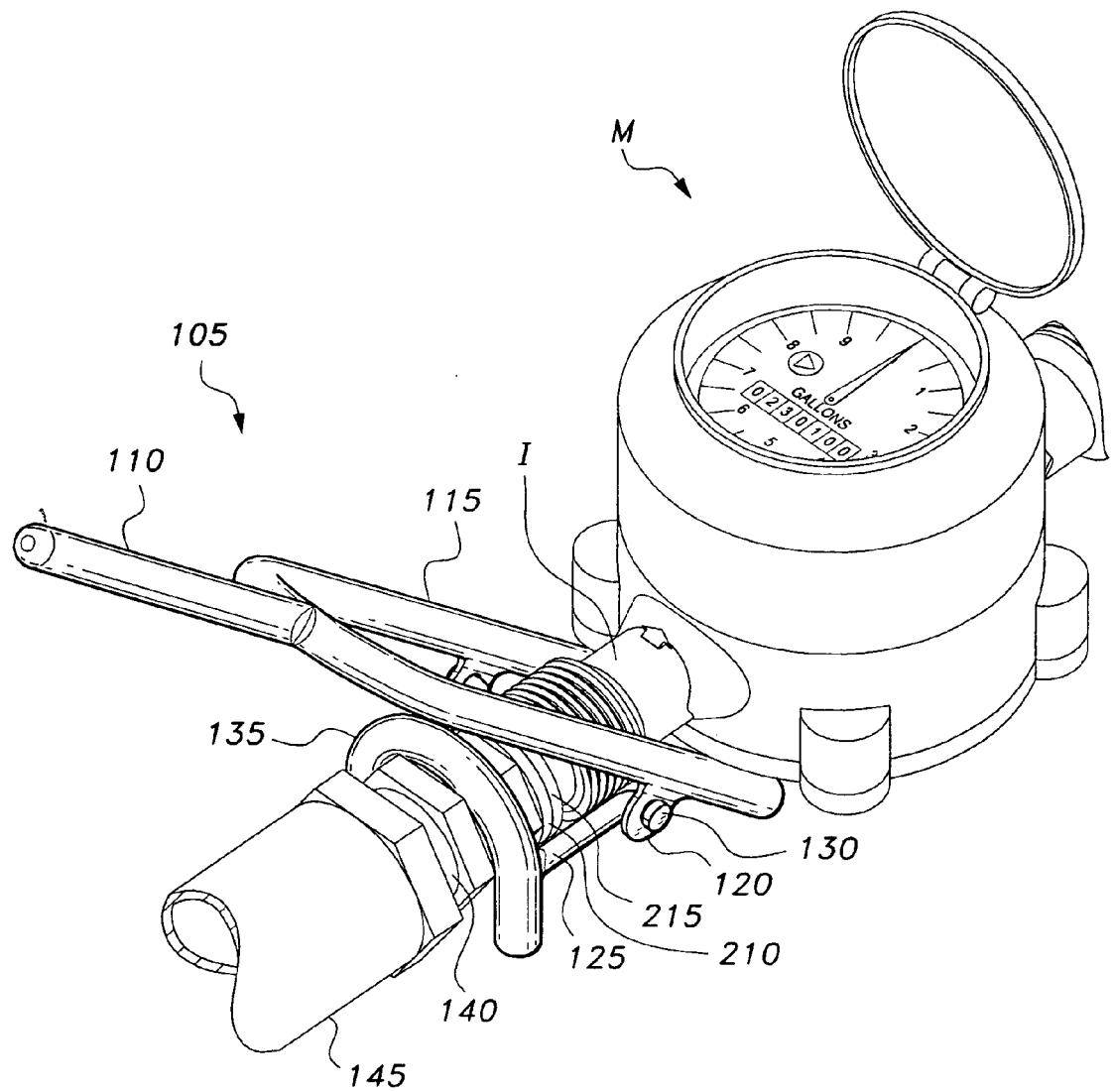
FIG. 2 is an environmental, perspective view of the meter connection spreading tool in a connection spreading position according to the present invention, showing the handle rotated to spread the meter from the conduit coupler.

As shown in FIGS. 1 and 2, the present invention is a meter connection spreading tool, designated generally as 105 in the drawings, that can be inserted between a conduit coupler 140 and a water meter M in order to separate the coupler 140 from the meter M. The tool 105 may be provided in a variety of sizes to accommodate the variety of conduit sizes that may be encountered. For example, a tool 105 adapted for ⅝", ¾" or 1" water meters may be provided.

Figure 3:
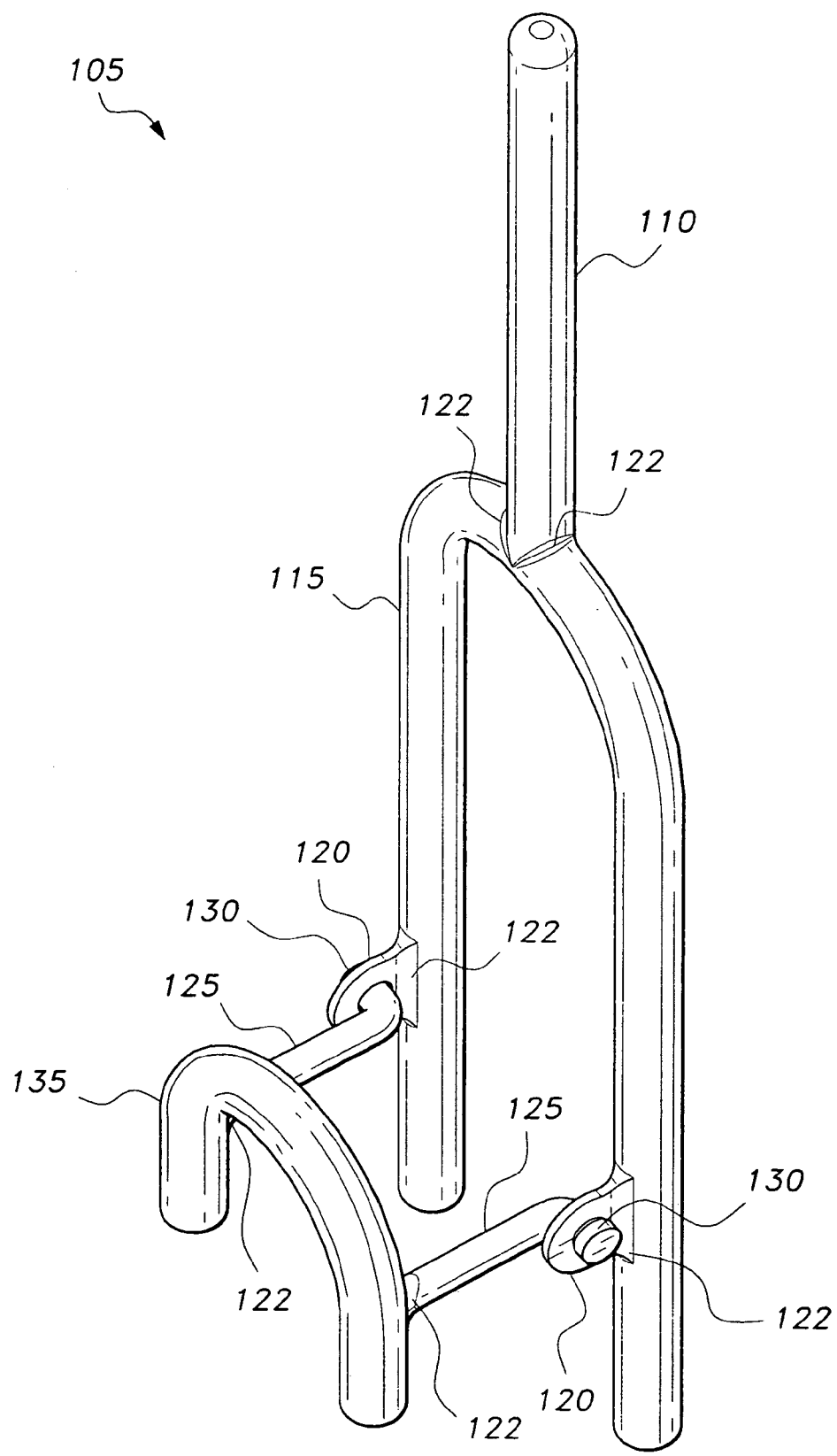
FIG. 3 is a perspective view of the meter connection spreading tool according to the present invention.

Referring to FIG. 3, the tool 105 has an elongated handle 110 terminating in a fork 115. The tines of the fork 115 are elongated and adapted for bearing against the body of the water meter M, the tines of the fork 115 being separated enough to fit over the inlet I or outlet pipe of the meter M. The fork 115 may be formed by a U-shaped rod attached to the end of a linear rod 110 by welds 122. A pair of lugs 120 extend normal to the tines of the fork 115 adjacent the ends of the tines. The lugs 120 may be attached to the fork by welds 122.

The tool 105 includes a rigid, U-shaped jaw 135 having a pair of links or arms 125 rigidly attached to the legs of the jaw 135, preferably adjacent the bight. The arms 125 may be attached to the jaw 135 by welds 122. The free ends of the arms 125 are pivotally inserted through holes defined in the lugs 120 and secured by flanges 130 that may be formed by flattening or peening the ends of the arms 125. The arms 125 may pivot within any angular range about the lugs 120 that permits arms 125 to extend normal to the fork 115 with the open ends of the jaw 135 and the fork 115 facing the same direction. The arms 125 may pivot within a range of about 30°-180° for maximum maneuverability. The handle 110, fork 115, lugs 120, arms 125, and jaw 135 are preferably made from steel.

As shown in FIG. 1, the tool 105 is inserted between the meter M and the coupler 140, which may be a compression fitting, adapter, or the like fixed to the end of conduit 145 and which has a coupling nut that can be threaded onto nipple N at the end of meter inlet pipe I. Conduit 145 is usually rigidly supported by straps or the like so that conduit 145 is relatively immovable. Jaw 135 is positioned to support a shoulder, nut or flange on coupler 140, while the tines of fork 115 are placed over meter inlet I adjacent the body of the meter M.

As shown in FIG. 2, the handle 110 and fork 115 form a lever that can be rotated or pivoted about a fulcrum formed by lugs 120 and the ends of arms 125. The tines of fork 115 bear against the body of meter M and push the meter M away from conduit 145 sufficiently to allow placement of a gasket or washer 215 between the nipple N and the outermost flange or shoulder 210 of coupler 140. The tool 105 may be used with a single hand, so that the user may use his or her other hand to insert the washer 215. When the handle 110 is rotated in the reverse direction, tension on the opposite side of meter M moves the meter M back to its starting position to capture the washer 215 between nipple N and coupler shoulder 210. The coupling nut may then be threaded onto nipple N to firmly reattach the conduit 145 to meter M.

It is to be understood that the present invention is not limited to the embodiment described above, but encompasses any and all embodiments within the scope of the following claims.

I claim:

1. A meter connection spreading tool, comprising:
   an elongate handle having an elongate bifurcated fork extending therefrom, the fork having tines, the fork being adapted for placement over a meter pipe with the tines adjacent a body of the meter;
   a pair of arms having first ends pivotally attached to the tines and having second ends;
   a rigid, U-shaped jaw rigidly attached to the second ends of the arms, the U-shaped jaw being dimensioned and configured for abutting a coupler fixed to a conduit removably attached to the meter pipe;
   wherein the handle and fork form a lever rotatable about the first ends of the arms to bear against the meter body in order to separate the conduit coupler from the meter pipe.

2. The meter connection spreading tool according to claim 1, wherein the fork comprises a U-shaped rod attached to the end of a linear rod by welds.

3. The meter connection spreading tool according to claim 1, further comprising: a pair of lugs extending normal to the tines of the fork, the pair of lugs being adjacent the ends of the tines.

4. The meter connection spreading tool according to claim 3, wherein the free ends of the arms are pivotally inserted through holes defined in the pair of lugs, the free ends having flanges retaining the free ends in the holes.

5. The meter connection spreading tool according to claim 1, wherein the tool is comprised of steel.

6. The meter connection spreading tool according to claim 1, wherein said arms pivot between 30°-180° on said tines.

7. A meter connection spreading tool, comprising:
   a U-shaped jaw having a pair of legs and a bight connecting the legs, the jaw being adapted for placement over a conduit and bearing against a conduit coupling;
   a pair of arms having first ends rigidly attached to the legs and opposing second ends, the arms extending normal to the jaw;
   a lever having a U-shaped fork including a pair of elongated tines and a bight connecting the tines, the lever further having an elongated handle extending from the bight of the fork, the fork being adapted for placement over a meter port adjacent a body of the meter, the tines bearing against the meter body;
   a pair of lugs extending from the tines, the second ends of the arms being pivotally attached to the lugs, the lugs and the second ends defining a fulcrum;
   whereby the lever is pivotal about the fulcrum in order to separate the conduit from the meter port.

\* \* \* \* \*